June 30, 1931.  A. G. CARTER  1,811,916
BAND SAW WHEEL
Filed May 31, 1930   3 Sheets-Sheet 1
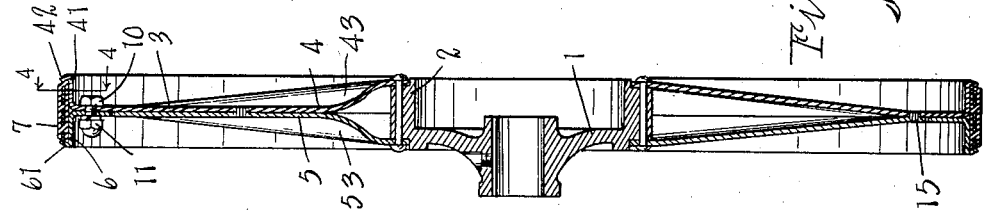
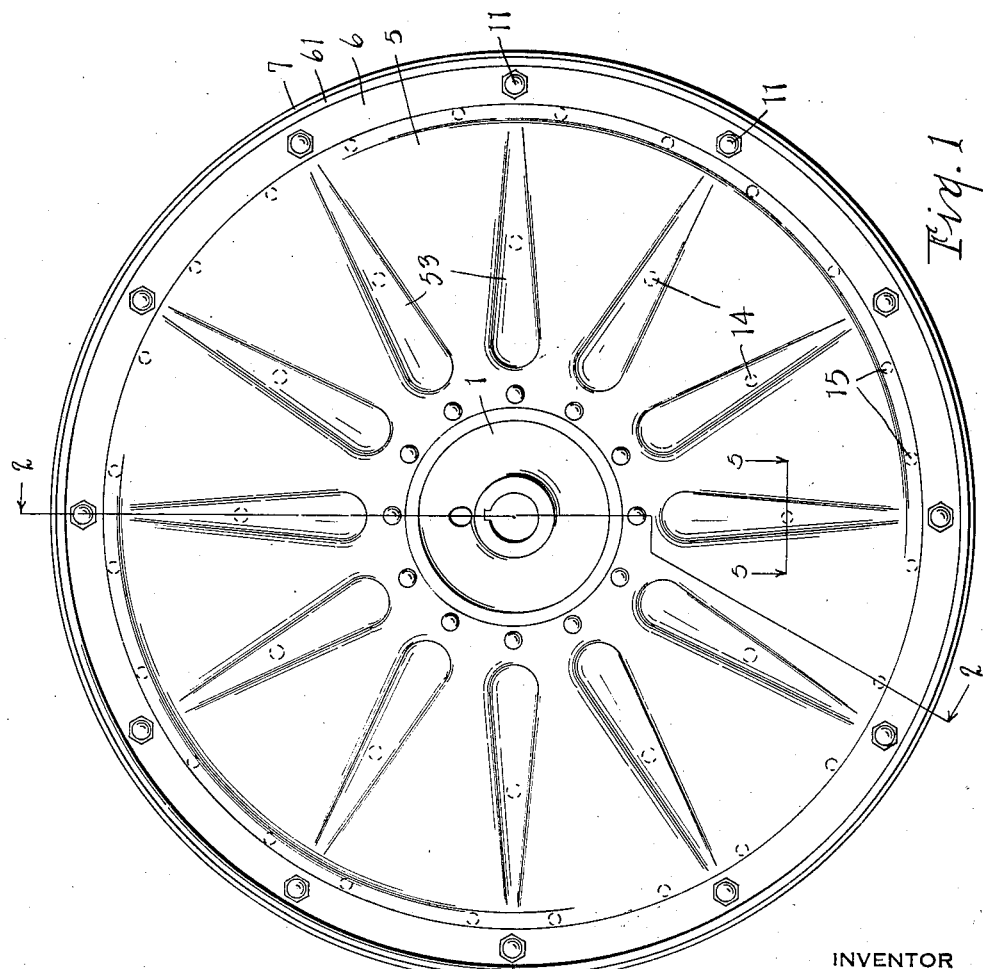
INVENTOR
Andrew G. Carter
BY Chappell & Earl
ATTORNEYS June 30, 1931.   A. G. CARTER   1,811,916
BAND SAW WHEEL
Filed May 31, 1930   3 Sheets-Sheet 2
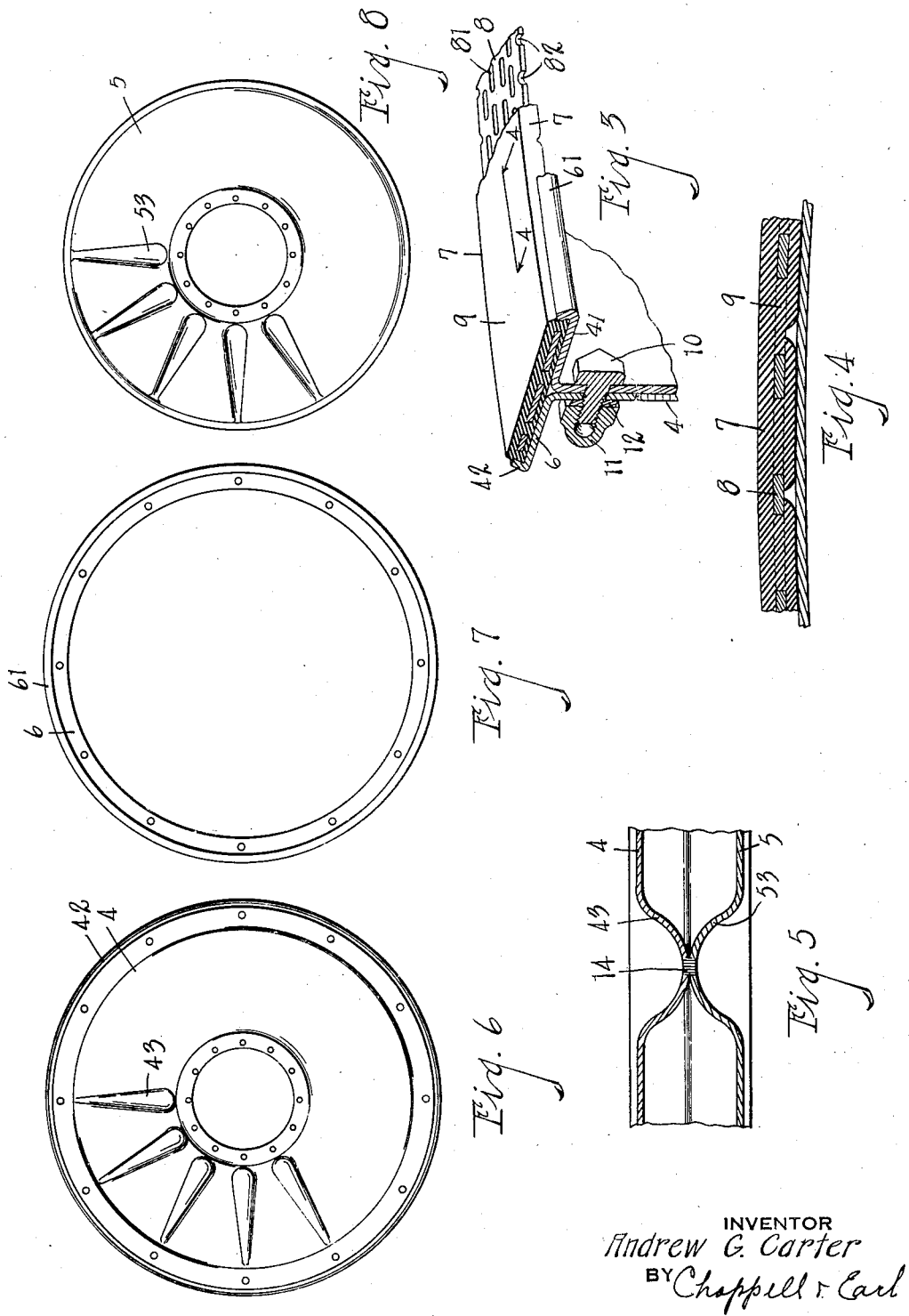
INVENTOR
Andrew G. Carter
BY Chappell & Earl
ATTORNEYS June 30, 1931.　　A. G. CARTER　　1,811,916
BAND SAW WHEEL
Filed May 31, 1930　　3 Sheets-Sheet 3

INVENTOR
Andrew G. Carter
BY Chappell & Earl
ATTORNEYS

Patented June 30, 1931

1,811,916

UNITED STATES PATENT OFFICE

ANDREW G. CARTER, OF GRAND RAPIDS, MICHIGAN, ASSIGNOR TO CARTER PRODUCTS COMPANY, INC., OF GRAND RAPIDS, MICHIGAN

BAND SAW WHEEL

Application filed May 31, 1930. Serial No. 458,809.

The objects of this invention are:

First, to provide such a structure with detachable tire which is perfectly balanced and true and very strongly braced.

Second, to provide such a structure in which the tire is very strongly held by simple and effective means.

Third, to provide an improved sheet metal body for such a wheel with air friction resistance reduced to a minimum.

Objects pertaining to details and economies will appear from the detailed description to follow.

Preferred embodiments of my invention are illustrated in the accompanying drawings, in which:

Fig. 1 is an elevation view from the outer hub side of such a wheel fully assembled but detached from its driving shaft.

Fig. 2 is a detail vertical sectional elevation on the irregular line 2—2 of Fig. 1, showing details of the assembly.

Fig. 3 is an enlarged detail perspective view of a portion of the rim, with portions broken away and showing a cross section cut through the wheel rim, tire, attaching clamp and one of the clamp bolts.

Fig. 4 is an enlarged detail longitudinal sectional view through the tire and rim, taken on a line corresponding to line 4—4 of Figs. 2 and 3.

Fig. 5 is an enlarged detail sectional view on line 5—5 of Fig. 1, showing the detail of the bracing depressions of the wheel.

Fig. 6 is a reduced detail of the complete disk member of the wheel with integral attaching flange.

Fig. 7 is a reduced detail of the rim portion that is formed by severing the periphery from a complete ring such as shown in Fig. 6.

Fig. 8 is a reduced detail of the wheel center that would be thus formed by cutting off the rim.

Figure 11:
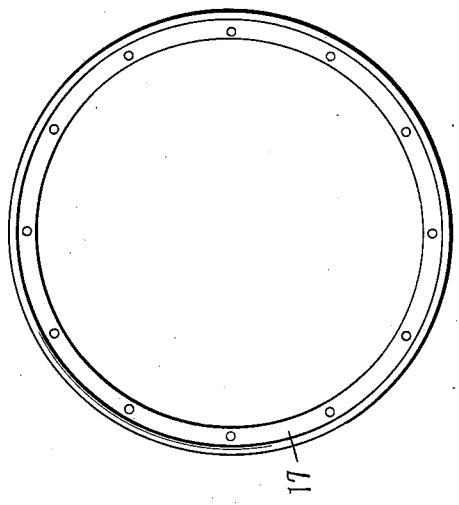
Fig. 11 is a reduced detail elevation view of one of the identical rings of the pair of detachable rims for attaching the tire.

The parts will be identified by their numerals of reference which are the same in all the views.

1 is the metal hub of the wheel (any style of hub) which is recessed for the application of four attaching screws to attach it to the driving shaft or arbor. The hub is provided with a thick recessed flange 2 at its periphery.

The web of the wheel 3 is made up of a pair of symmetrical convexed disks 4 and 5. The disk 4 is extended into an integral peripheral flange 41 having an out-turned engaging lip 42 for engaging the tire 7.

The disk 5 is identical and symmetrical with the web part of disk 4 of the wheel and a detachable flange 6 is provided which is symmetrical with the integral flange portions 41 and has an out-turned engaging lip 61 for engaging the tire 7.

The tire 7 is made up of a central reinforced sheet metal band member 8 having longitudinal perforations 81 in staggered relation and having half-round notches 82 at intervals at each edge. Around this reinforcing core is a vulcanized rubber cushion 9.

The detachable flange 6 is held in place by screw bolts 10 provided with cap nuts 11 and with lock washers 12 for retaining the same.

The disk 4 is provided with radial depression 43 and the disk 5 is supplied with precisely similar radial depressions 53. These depressions are exactly symmetrical and the two halves of the wheel are secured one to the other by spot welding 14 in these depressions.

The periphery of the disk 5 is secured to the disk 4 by spot weldings 15, see Figs. 1 and 2.

By this means a perfectly balanced wheel is secured, the two halves of the web are struck up from exactly similar sheet metal by the same die. The periphery of the rim of the disk 5 is then cut off forming the detachable flange ring 6 for attaching the tire 7.

This results in very great economy of material, it being merely necessary to remove the burr from the periphery of the disk 5 and from the ring 6 to enable the parts to be perfectly fitted together and form a perfectly symmetrical wheel.

The tire is clamped very effectively by the engagement of the projecting lips 42 and 61 with the rubber projecting at the edge. This can be clamped very securely, there being no danger of cutting off the tire because of the rubber embedded in the notches 82.

Figure 10:
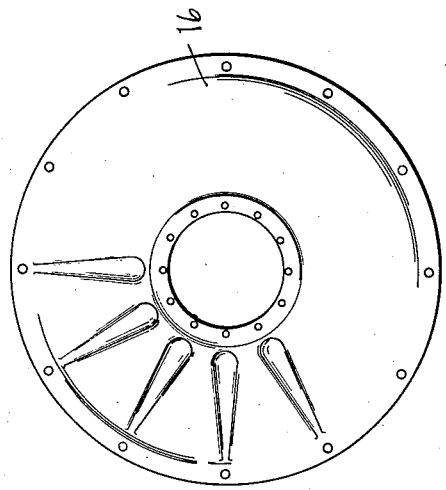
Fig. 10 is a reduced detail elevation view of one of the pair of identical disks of such a wheel.
Figure 9:
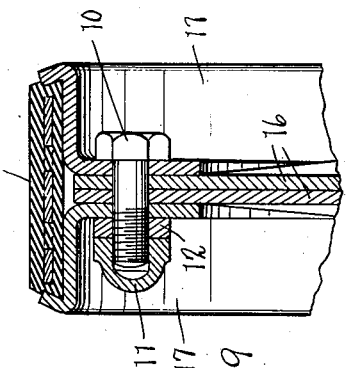
Fig. 9 is an enlarged detail transverse sectional view through the detachable attaching rim portion of a modified form of my improved wheel.

In Figs. 9, 10 and 11, I show a modification of my improved wheel in which the symmetrical halves are secured, but the economy of metal is not so great. The wheel is made up of exactly symmetrical disks 16 and it is provided with exactly similar symmetrical detachable flanges 17 which are retained by the same bolts, nuts and lock nuts 10, 11 and 12 of the original structure, the tire 7 not being in any way changed.

Having thus described my invention, what I claim as new and desire to secure by Letters Patent, is:

1. A band saw wheel comprising a hub with recessed broad peripheral flange, a wheel made of exactly opposed symmetrical convexed sheet metal disks embracing the said flange and having precisely similar meeting radial depressions spot welded together and spot welded at the periphery, one of said disks being extended into a peripheral flange having an engaging lip for the tire, the other of said disks being cut off within its periphery, an angular flange symmetrical with the integral flange portion and having an engaging lip for the tire, bolts with lock nuts through the flanged periphery and ring to couple the parts together, and a cushion tire for the said wheel having flat reinforced slitted metallic rim embedded therein.

2. A band saw wheel comprising a hub with recessed broad peripheral flange, a wheel made of exactly opposed symmetrical convexed sheet metal disks embracing the said flange and having precisely similar meeting radial depressions spot welded together, and spot welded at the periphery, one of said disks being extended into a peripheral flange having an engaging lip for the tire, the other of said disks being cut off within its periphery, an angular flange symmetrical with the integral flange portion and having an engaging lip for the tire, bolts with lock nuts through the flanged periphery and ring to couple the parts together, and a detachable tire for said wheel.

3. A band saw wheel comprising a hub with recessed broad peripheral flange, a wheel made of exactly opposed symmetrical convexed sheet metal disks embracing the said flange spot welded at the periphery, one of said disks being extended into a peripheral flange having an engaging lip for the tire, the other of said disks being cut off within its periphery, an angular flange symmetrical with the integral flange portion and having an engaging lip for the tire, bolts with lock nuts through the flanged periphery and ring to couple the parts together, and a detachable tire for said wheel.

4. A band saw wheel comprising a hub with recessed broad peripheral flange, a wheel made of exactly opposed symmetrical convexed sheet metal disks embracing the said flange suitably joined, one of said disks being extended into a peripheral flange having an engaging lip for the tire, the other of said disks being cut off within its periphery, an angular flange symmetrical with the integral flange portion and having an engaging lip for the tire, bolts with lock nuts through the flanged periphery and ring to couple the parts together, and a detachable tire for said wheel.

5. A band saw wheel comprising a hub having a broad peripheral flange, a wheel made up of exactly opposed sheet metal disks embracing the said flange and having precisely similar meeting radial depressions spot welded together and spot welded at the periphery, a pair of symmetrical flanges having tire engaging lips and bolts for retaining the said flanges on the said wheel body and in engagement with the tire, and a detachable tire for said wheel.

6. A band saw wheel comprising a hub having a broad peripheral flange, and a wheel made up of exactly opposed sheet metal disks embracing the said flange and having precisely similar meeting radial depressions spot welded together and spot welded at the periphery.

7. A band saw wheel comprising a hub having a broad peripheral flange, and a wheel made up of exactly opposed sheet metal disks embracing the said flange and having precisely similar meeting radial depressions suitably joined together.

In witness whereof I have hereunto set my hand.

ANDREW G. CARTER.